(12) United States Patent
Hunt et al.

(10) Patent No.: US 11,856,891 B2
(45) Date of Patent: Jan. 2, 2024

(54) SYSTEMS AND METHODS FOR CONTROLLING AN AGRICULTURAL HEADER

(71) Applicant: CNH Industrial America LLC, New Holland, PA (US)

(72) Inventors: Cory Douglas Hunt, Millersville, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 448 days.

(21) Appl. No.: 17/214,203

(22) Filed: Mar. 26, 2021

(65) Prior Publication Data
US 2022/0304228 A1    Sep. 29, 2022

(51) Int. Cl.
*A01D 41/14*    (2006.01)
*A01D 41/127*   (2006.01)

(52) U.S. Cl.
CPC ....... *A01D 41/141* (2013.01); *A01D 41/1278* (2013.01)

(58) Field of Classification Search
CPC .......................... A01D 41/141; A01D 41/1278
See application file for complete search history.

(56) References Cited

U.S. PATENT DOCUMENTS

| 6,389,785 B1 | 5/2002 | Diekhans et al. |
| 6,791,488 B2 | 9/2004 | Dickhans et al. |
| 9,301,446 B2 | 4/2016 | Peters et al. |
| 10,531,603 B2 | 1/2020 | Ferrari et al. |
| 2003/0000193 A1 | 1/2003 | Beck et al. |
| 2016/0270286 A1 | 9/2016 | Boydens et al. |
| 2019/0110394 A1 | 4/2019 | VanNahmen |
| 2020/0196527 A1 | 6/2020 | Ferrari et al. |

FOREIGN PATENT DOCUMENTS

| CN | 110262287 A | 9/2019 |
| CN | 111667017 A | 9/2020 |
| DE | 102015122305 A1 | 6/2017 |
| WO | 2019140512 A1 | 7/2019 |

OTHER PUBLICATIONS

Reven Precision; VSN® Visual Guidance; https://ravenprecision.com/products/guidance-steering/vsn; 6 pgs. dated Mar. 25, 2021.
Extended European Search Report for EP Application No. 22164526.0 dated Aug. 19, 2022.

*Primary Examiner* — Mathew Franklin Gordon
(74) *Attorney, Agent, or Firm* — Peter Zacharias

(57) ABSTRACT

An agricultural system includes a controller comprising a memory and a processor, wherein the controller is configured to receive data from a first and second sensor, each of which are mounted on an agricultural header and configured to output data indicative of one-dimensional (1D) distances. The controller is configured to determine a first horizontal distance from the first sensor to a first plant stalk and a second horizontal distance from the second sensor to a second plant stalk based on the 1D distance data. The controller is also configured to control a steering system of the agricultural system to adjust a position of the agricultural header relative to the first and second plant stalks based on a difference between the first horizontal distance and the second horizontal distance.

20 Claims, 5 Drawing Sheets

SYSTEMS AND METHODS FOR CONTROLLING AN AGRICULTURAL HEADER

BACKGROUND

The present disclosure generally relates to systems and method for controlling an agricultural header.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. The course of the harvester may be adjusted to position a header along certain rows of crops. The height and angle of the header may also be adjusted to properly harvest the crops. In addition, the header may have a set of sensor(s) for sensing row alignment, sensing the height of the header off the ground, sensing the height of a crop canopy, or the like. The sensors may be attached to the harvester, the header, one or more structures attached thereto, or a combination thereof.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes a controller comprising a memory and a processor, wherein the controller is configured to receive data from a first and second sensor, each of which are mounted on an agricultural header and configured to output data indicative of one-dimensional (1D) distances. The controller is configured to determine a first horizontal distance from the first sensor to a first plant stalk and a second horizontal distance from the second sensor to a second plant stalk based on the 1D distance data. The controller is also configured to control a steering system of the agricultural system to adjust a position of the agricultural header relative to the first and second plant stalks based on a difference between the first horizontal distance and the second horizontal distance.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
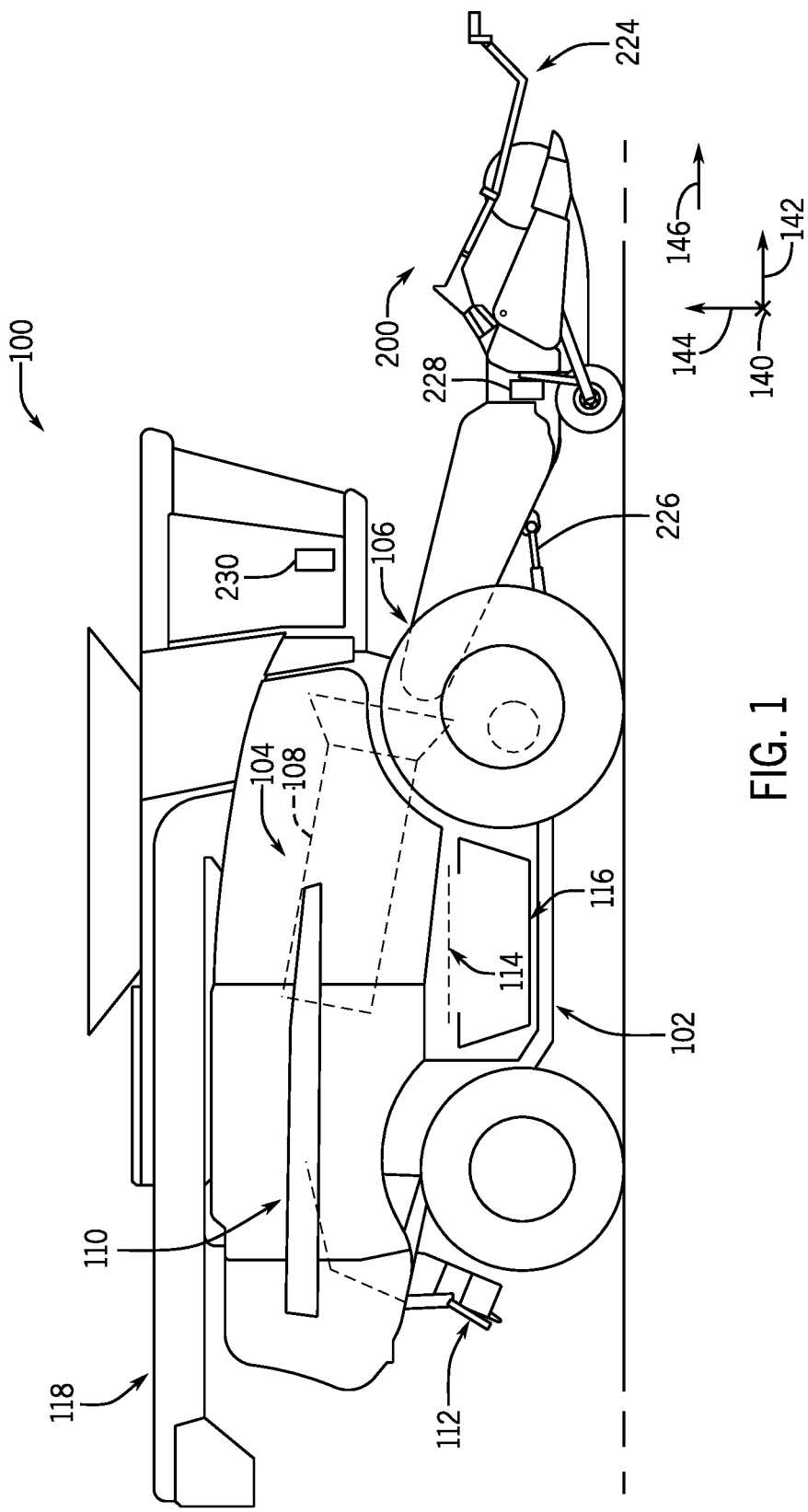
FIG. 1 is a side view of an embodiment of an agricultural system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header. The harvester may be at least partially automated so as to harvest crops at least partially independent of human control. During automated harvesting, the harvester may encounter curved crop rows, inclined soil surfaces, as well as crops of varying canopy height. Accordingly, the harvester may be outfitted with a variety of sensors. The harvester may utilize data gathered from the sensors to adjust row alignment, header height, and header angle in response to the environment. The harvester and header may be outfitted with sensors for sensing row alignment, canopy height, header height above the ground, soil surface incline, and the like. Each piece of data in the above list may be sensed by one or more distinct sensors.

A harvester guidance system utilizing a single sensor type may simplify automated harvester guidance systems and decrease cost of the harvester. The present disclosure is directed to a control system including a pair of multi-purpose sensors that may be utilized to automate row alignment, header height, header angle, and the like. For instance, a pair of one-dimensional (1D) sensors may face in a perpendicular direction to the motion of the harvester. The sensors may also point partially toward the ground and partially toward the horizon, so as to detect the vertical distance from the header to the ground and the horizontal distance from a part of the header to the nearest crop stalk. A control system may use the data collected from the sensors to control the row alignment, header height, and header angle.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. Each axis is fixed and independent of the orientation of the header 200. The agricultural system 100 and/or its components may also be described with reference to a direction of travel 146.

In the illustrated embodiment, the agricultural system 100 may include one or more actuators configured to manipulate the spatial orientation and/or position of the header with respect to the agricultural system chassis, and/or the spatial orientation of the header with respect to the crop rows, or ground/soil. A header height actuator 226 may drive the header 200 to move along the direction 144 relative to the ground. The header 200 may be attached to the chassis via a four bar linkage. The position of the four bar linkage may be manipulated by the header height actuator 226 to adjust the height of the header. The agricultural system 100 may also include a header orientation actuator 228. The header orientation actuator 228 may be configured to rotate the angular orientation of the header 200 relative to the ground. The agricultural system 100 may also include a steering system 230. The steering system 230 may be configured to control the trajectory of the agricultural system 100 and the header 200 along a path. The steering system may include one or more mechanical and electronic components configured to manipulate the steering components of the agricultural system, such as a set of wheels. The actuators and steering system may be manipulated in response to one or more stimuli to adjust the agricultural system 100 to one or more environmental variables (e.g., soil condition, terrain, crop damage, etc.).

Figure 2:
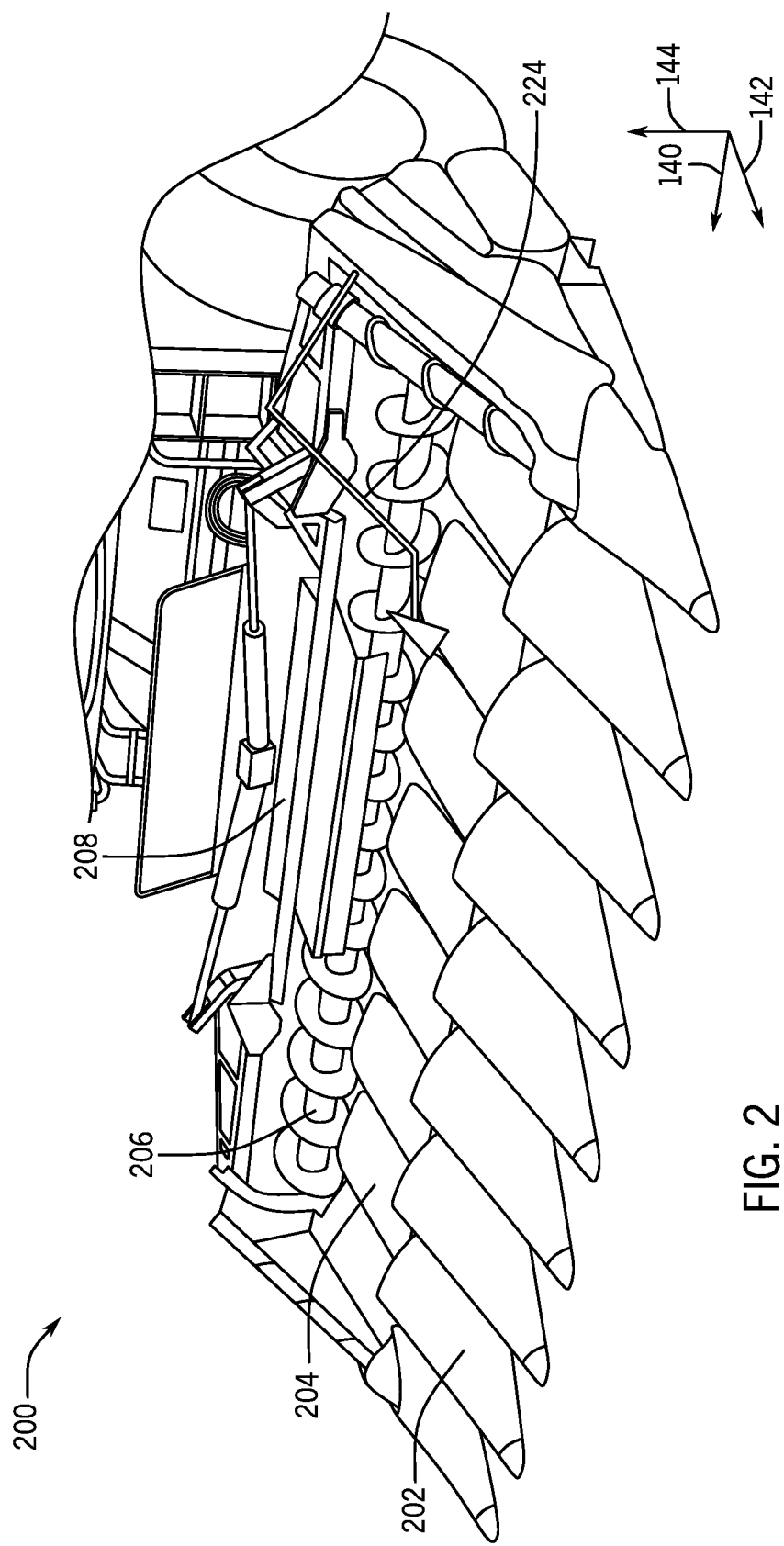
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes multiple separators 202 configured to separate rows of a crop (e.g., corn). The separators 202 may be evenly spaced along the header horizontally. As the header moves along the path, the separators 202 may direct crops from each row to one or more row units 204. The row units 204 are configured to cut a portion of each crop (e.g., a stalk), thereby separating the crop from the soil. The cut crop may be directed to one of a pair of augers 206 configured to convey the cut crop laterally inward to a crop conveyor 208 at the center of the header. As illustrated, the augers 206 extend along a substantial portion of the width of the header 200 (e.g., along the lateral axis 140). The augers 206 may be driven by a driving mechanism located (e.g., electric motor, hydraulic motor, etc.). As the agricultural system 100 is driven through the field, the separators 202 direct the rows of crops into the row units 204. The row units engage and cut the crops within the field, and the augers 206 transport the cut crop to the crop conveyor 208, which directs the crops to toward the inlet of the agricultural crop processing system.

In the illustrated embodiment, the header 200 includes one or more sensor mounts 224. Each sensor mount may include a structure (e.g., truss, tube, solid member, etc.) that holds one or more sensors in desired location(s) (e.g., relative to the frame 201). The sensor mounts may attach to any portion of the header 200, and may have a geometry that orients the attached sensors in a target direction.

Figure 3:
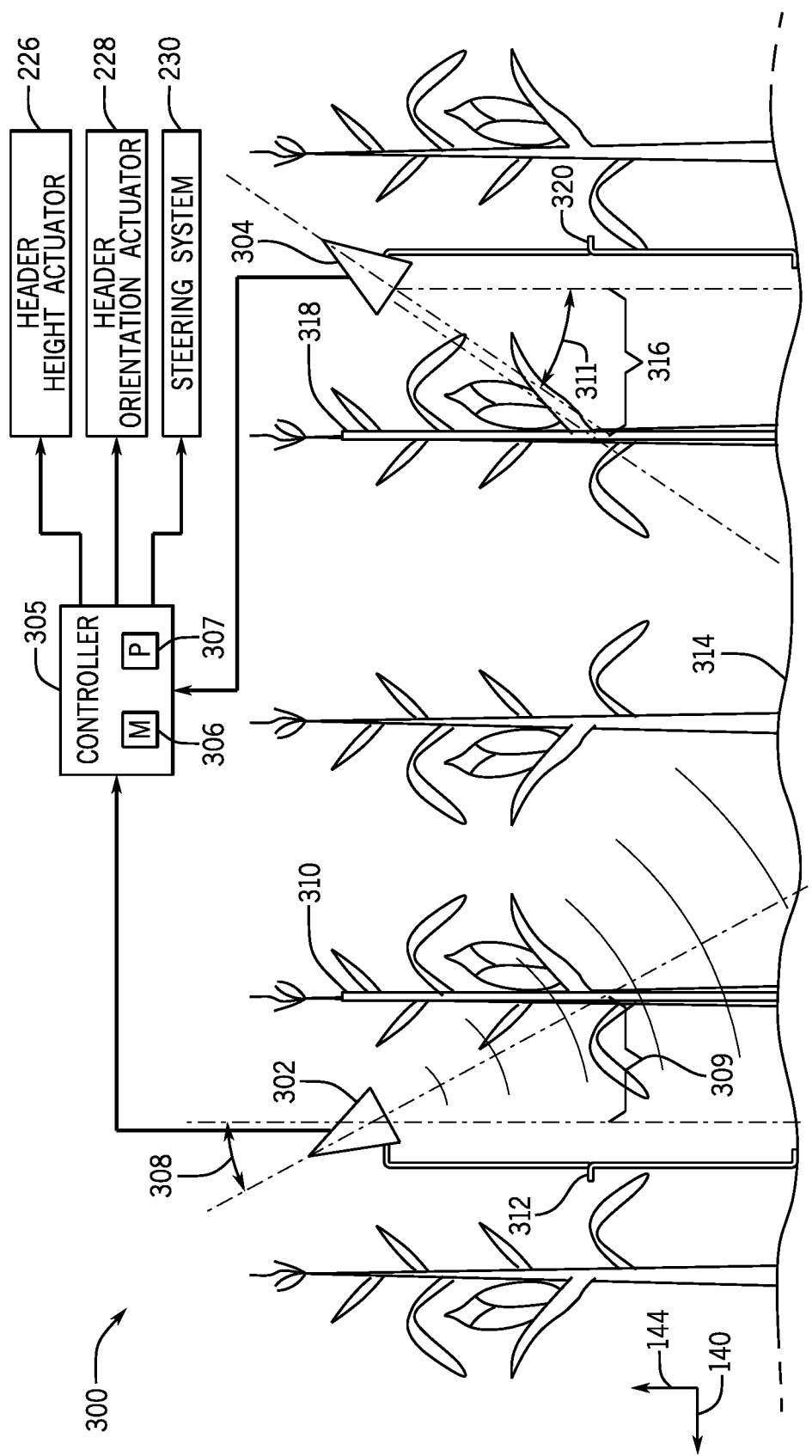
FIG. 3 is a schematic diagram of an embodiment of a control system that may be employed within the agricultural system of FIG. 1, in accordance with an aspect of the present disclosure.

With this in mind, FIG. 3 is a schematic diagram of an embodiment of a control system 300 that may be employed within the agricultural system of FIG. 1. In the illustrated embodiment, the control system 300 includes a left sensor 302 and a right sensor 304. The left sensor 302 and the right sensor 304 may include any suitable type(s) of sensor(s) (e.g., light detection and ranging (LIDAR) sensor(s), radio detection and ranging (radar) sensor(s), etc.) configured to output one-dimensional (1D) distance data. In another embodiment, the sensors may be configured to output two-dimensional (2D) distance data. Each sensor may be positioned ahead of the header along the direction of travel (e.g., mounted on a respective sensor mount disclosed above with reference to FIG. 2) and oriented to point generally perpendicularly to the direction of travel (e.g., substantially perpendicularly, or approximately 90 degrees with respect to the axis). Additionally, each sensor may be angled partially downward and partially horizontally toward the centerline of the header. For example, the right sensor 304 may be mounted near the right edge of the header 200 and angled 45 degrees below the lateral axis or direction 140 within the plane created by the lateral axis or direction 140 and the vertical axis or direction 144. In another example, the left sensor 302 may be mounted near the left edge of the header 200 and angled 45 degrees below the lateral axis or direction 140 within the plane created by the lateral axis or direction 140 and the vertical axis or direction 144. In yet another example, each sensor may be angled outward, toward the edges of the header. The left sensor 302 and right sensor 304 may each output data indicative of the distance from the sensor to a target object (e.g., the crops being harvested, the ground/soil surface, etc.). Additionally, the sensors are configured to output the data to a controller. In some embodiments, there may be more than a single pair of sensors. In other embodiments, there may be a single sensor. In yet more embodiments, the sensors may be mounted anywhere in between the centerline of the header and the edges of the header.

In the illustrated embodiment, the control system 300 includes a controller 305 configured to receive data from the sensors and to control operation of at least a portion of the agricultural system, such as the alignment of the header with the crop row, and the height and angle of the header. The controller 305 includes a memory 306 and a processor 307 (e.g., a microprocessor). The controller 305 may also include one or more storage devices and/or other suitable components. The processor 307 may be used to execute software, such as software for controlling the agricultural system and/or the header. Moreover, the processor 307 may include multiple microprocessors, one or more "general-purpose" microprocessors, one or more special-purpose microprocessors, and/or one or more application specific integrated circuits (ASICS), or some combination thereof. For example, the processor 307 may include one or more reduced instruction set (RISC) or complex instruction set (CISC) processors. The memory 306 may include a volatile memory, such as random access memory (RAM), and/or a nonvolatile memory, such as read-only memory (ROM). The memory 306 may store a variety of information and may be used for various purposes. For example, the memory 306 may store processor-executable instructions (e.g., firmware or software) for the processor 307 to execute, such as instructions for controlling the agricultural system and/or the header. The memory 306 and/or the processor 307, or an additional memory and/or processor, may be located in any suitable portion of the agricultural system. By way of example, the controller 305 may be located in a cab of the agricultural system and/or on the header.

In the illustrated embodiment, the controller 305 is communicatively coupled to the sensors 302, 304 and configured to receive data from the sensors. The left sensor 302 and the right sensor 304 may each output 1D distance data to the controller 305, and the controller 305 may control the agricultural system (e.g., header row alignment, header height, header angle, or a combination thereof) based on the 1D distance data from the sensors. For example, the left sensor 302 and/or the right sensor 304 may output one-dimensional distance data in real time or near real time. The controller 305 may use the 1D distance data from the left sensor 302, along with a left angle 308, to determine a left horizontal distance 309 from the left sensor 302 to the left stalk 310. The left angle 308 may be an angle between the vertical axis 144 and a 1D line sensed by left sensor 302. In addition, the controller 305 may determine a left vertical distance 312 from the left sensor 302 to the soil surface 314 based on the 1D distance data from the left sensor 302 and a right angle 311. The right angle 311 may be an angle between the vertical axis 144 and a 1D line sensed by right sensor 304. The controller 305 may also determine a right horizontal distance 316 and a right vertical distance 318 based on the 1D distance data from the right sensor 304.

The controller 305 may use the left horizontal distance 309, the left vertical distance 312, the right horizontal distance 316, and the right vertical distance 320 to facilitate automatic control of at least a portion of the agricultural system 100. For example, the controller 305 may control the one or more actuators of the agricultural system 100 to automatically adjust the row alignment of the header, the header height, the header angle, or a combination thereof. The controller 305 may be communicatively coupled to the header height actuator 226 and may be configured to output control signals to the actuator to adjust the height of the header relative to the agricultural system chassis. For example, the controller 305 may determine that the left vertical distance 312 and right vertical distance 320 are below a certain height threshold value. In response, the controller 305 may control the header height actuator 226 to raise the header so that it is in the threshold range value. In another example, the controller 305 may determine that the left vertical distance 312 and right vertical distance 320 are above the height threshold range value. In response, the controller 305 may control the header height actuator 226 to lower the header so that it is within the threshold range value. The controller 305 may also be communicatively coupled to the header orientation actuator 228 and may be configured to output control signals to the actuator to adjust the angular orientation of the header relative to the agricultural system chassis. For example, the controller 305 may determine that a difference between the left vertical distance 312 and the right vertical distance 320 is greater than a threshold range value. In response, the controller 305 may cause the header orientation actuator 228 to rotate the header until the difference between the left vertical distance 312 and the right vertical distance 320 is less than the threshold range value. The controller 305 may also be configured to be communicatively coupled to the steering system 230 and may be configured to output control signals to the steering system to adjust the row alignment of the agricultural system 100 and the header 200. For example, the controller 305 may determine that the left horizontal distance 309 exceeds the right horizontal distance 316 greater than a threshold range value. In response, the controller 305 may cause the steering system 230 to turn the agricultural system 100 to the right to align with the crop rows. Alternatively, in one example the controller 305 may determine that the right horizontal distance 316 exceeds the left horizontal distance 309 greater than the threshold range value. In response, the controller 305 may cause the steering system 230 to turn the agricultural system 100 to the left to align with the crop rows. In this embodiment, as well as the embodiments disclosed above, the processor 305 may perform the method described below.

Figure 4:
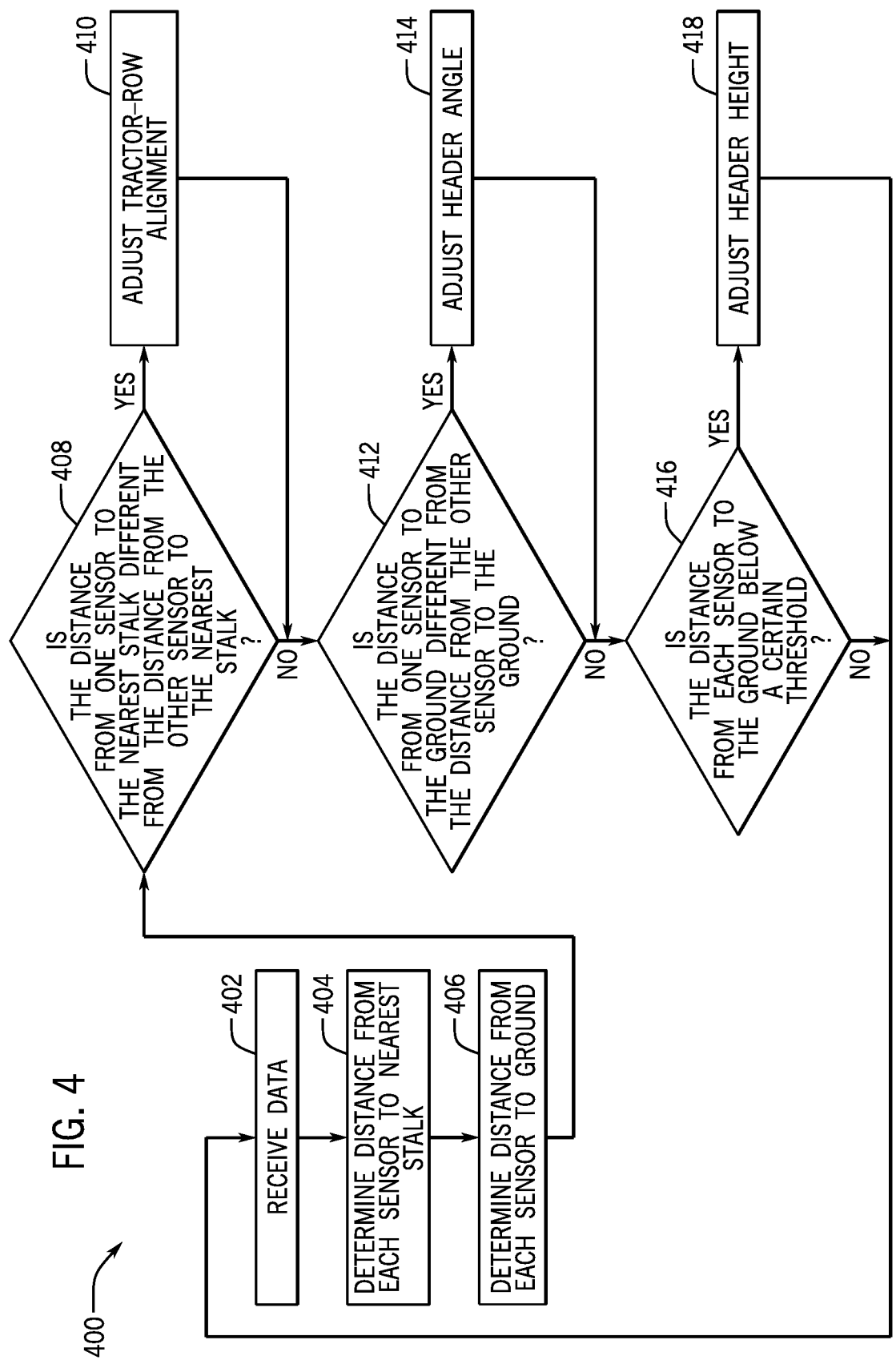
FIG. 4 is a flowchart of an embodiment of a method for adjusting header alignment, height, and angle, in accordance with an aspect of the present disclosure.

FIG. 4 is a flowchart of an embodiment of a method 400 for adjusting header alignment, height, and angle. The method 400 may be performed via the controller disclosed above, or another suitable device. Further, the method 400 may be performed differently in additional or alternative embodiments. For instance, additional steps may be performed with respect to the method 400, and/or certain steps of the method 400 may be modified, removed, performed in a different order, or a combination thereof. The method 400 may be performed based on data received from the one-dimensional sensors of FIG. 3, and/or based on data received from two-dimensional sensor(s) mounted above the crop rows. The method 400 may also be performed based on an embodiment of FIG. 3 including one sensor.

At block 402, data from the 1D sensors described in FIG. 3 is received. For example, the left sensor and the right sensor may output 1D distance data to the controller. The 1D distance data may be indicative of the linear distance between each sensor and the nearest crop stalk, as well as the linear distance between the sensor and the soil surface. In certain embodiments, at least one sensor may output 1D distance data indicative of distance values between the sensor and the nearest object(s) (e.g., the nearest crop stalk, the soil surface, etc.). Furthermore, in certain embodiments, at least one sensor may be capable of sending data concerning two points at once in its line of sight. The sensor may measure a distance between the sensor and a stalk, as well as the distance between the sensor and the soil surface 314 at once. The sensor may measure two points at once by penetrating through the stalk.

At block 404, the data is analyzed to determine the distance from each sensor to the nearest crop stalk. The horizontal component of the distance is then determined. For example, the left horizontal distance may be determined based on the angle of the left sensor and the linear distance between the left sensor and the left stalk. In addition, the right horizontal distance may be determined based on the angle of the right sensor and the linear distance between the right sensor and the right stalk. In some embodiments, the data may be 2D, and the controller may selectively utilize 1D data from a plane of the 2D data. In other embodiments, the data may be analyzed from one sensor to determine one distance (e.g., from the left sensor to the left stalk).

At block 406, the data is analyzed to determine the distance from each sensor to the soil surface 314. Similar to block 406, the vertical component of the distance may be determined based on the left angle 308 and the linear distance between the left sensor 302 and the soil surface 314 to determine the left vertical distance 312. In addition, the right vertical distance 320 may be determined based on the right angle 311 of the right sensor and the linear distance between the right sensor and the soil surface 314. In other embodiments, the data may be analyzed from one sensor to determine one distance (e.g., from the left sensor to the soil surface).

At block 408, a determination is made regarding whether a difference between the left horizontal distance and the right horizontal distance is greater than a threshold range value. A difference in distances may be indicative of misalignment between the header and the rows of crops being harvested. For instance, if the left horizontal distance is greater than the right horizontal distance, the header may be following a course that veers left of the targeted crop rows. The misalignment may be due to a curve in the rows, soil conditions, or the like. In another embodiment, a determination is made regarding whether a single distance is within a threshold range value (e.g., whether the left horizontal distance is within a threshold range). If the difference between the left horizontal distance and the right horizontal distance is greater than the threshold range value, the process may continue to block 410. If not, the process may continue to block 412.

At block 410, the course of the agricultural system is adjusted. The course of the agricultural system may be adjusted to realign the header with the targeted crop rows. In other words, the direction of the agricultural system may be adjusted so that the difference between the left horizontal distance and the right horizontal distance is less than the threshold range value. For example, if the right horizontal distance is greater than the left horizontal distance, the course of the agricultural system may be adjusted to the left. In one example, the processor may control the steering system 230 to adjust the course.

At block 412, a determination is made regarding the left vertical distance and the right vertical distance. In one embodiment, the controller 305 may determine whether the difference between the left vertical distance and the right vertical distance is greater than a threshold range value. A difference in distances may indicate that the header is not parallel to the soil surface. For instance, if the left vertical distance is greater than the right vertical distance, the header may be angled askew of the soil surface. If the difference between the left vertical distance and the right vertical distance is greater than the threshold range value, the process may continue to block 414. If not, the process may continue to block 416.

At block 414, the angle of the header relative to the soil surface may be adjusted. For example, the header may be rotated based on the left vertical distance and the right vertical distance. In another example, the header may be rotated until the header is substantially even with the soil surface. The header may be substantially parallel to the soil surface once the difference between the left vertical distance and the right vertical distance is less than the threshold range value. In one example, if the header is rotated too far clockwise, the left vertical distance may be greater than the right vertical distance. In response, the header may be rotated counterclockwise until the difference between the left vertical distance and right vertical distance is less than the threshold range value. Establishing a substantially level header enables the header to harvest the crops at a uniform height. In one example, the processor may control the header orientation actuator 228 to rotate the header. In another example, the angle of the header may be rotated based on a single distance (e.g., the left vertical distance) and data received from one or more rotation sensors installed on the header and the agricultural system and configured to send data regarding the angle of the header relative to the soil surface.

At block 416, a determination is made regarding whether the distance from each sensor to the soil surface is within a certain threshold range. The threshold range may be a header height range at which the harvested crop retains an undesirable length of stalk. The threshold range may be determined by the controller 305, or manually input by a user. If the left vertical distance 312, the right horizontal distance 320, both, an average, or any mathematical combination of the two are below the threshold range, the process may continue to block 418. If not, the process may continue to block 402 and repeat the method 400. In another embodiment, a determination is made regarding whether a single distance is greater than a threshold range value (e.g., whether the left vertical distance is greater than a threshold range value).

At block 418, the height of the header is adjusted. The height of the header may be raised or lowered so that the left vertical distance 312, the right horizontal distance 320, both, or an average of the two are within the threshold range. For example, if the left vertical distance and right vertical distance are equal and above the threshold range, the height of the header may be lowered to be within the threshold range. The header 200 may also be rotated until it is parallel with the soil surface before the height of the header is adjusted. In one example, the processor may control the header height actuator 226 to rotate the header. The process may repeat the method 400 as the agricultural system 100 harvests crops.

Figure 5:
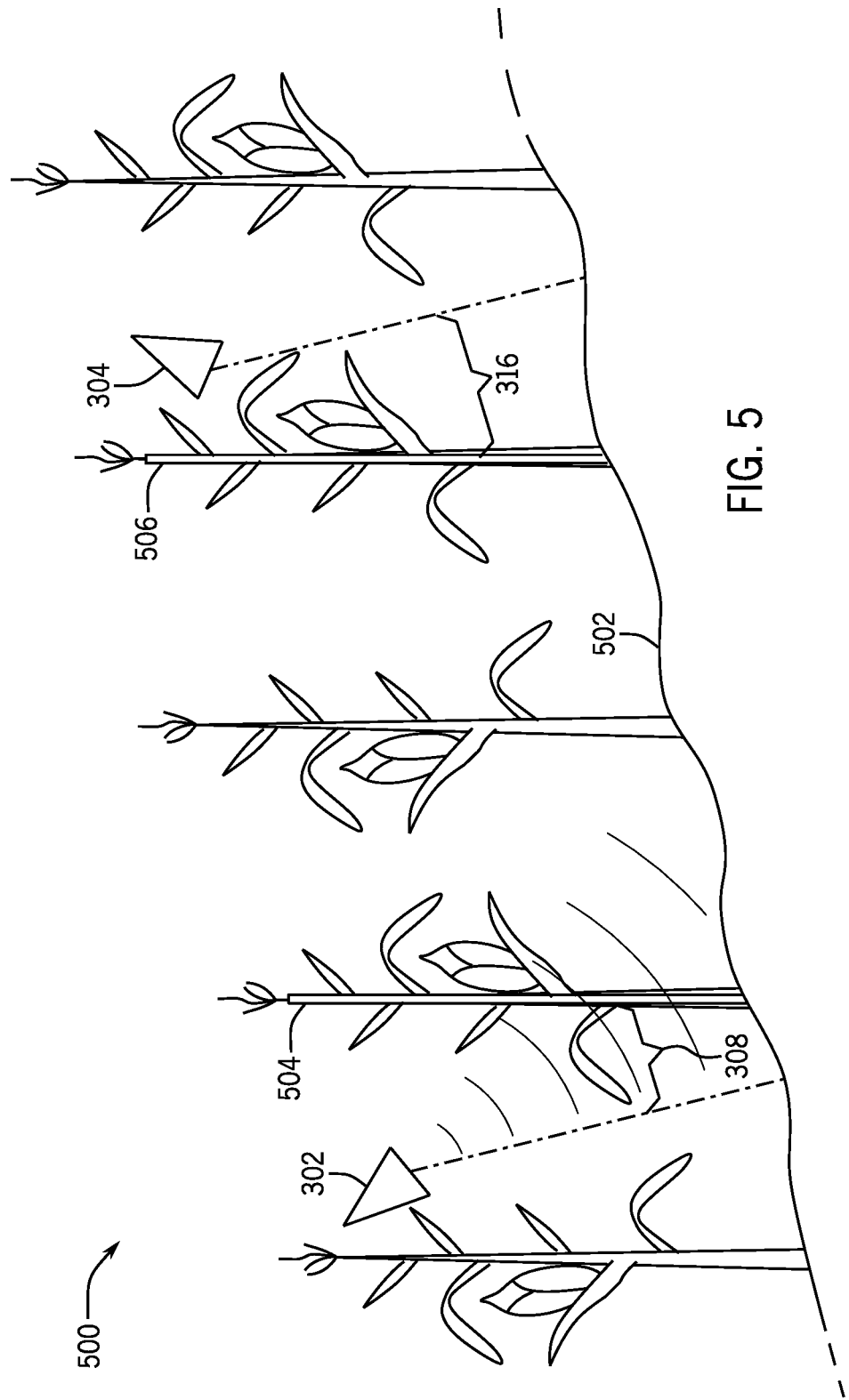
FIG. 5 is a schematic diagram of an embodiment of the control system of FIG. 3, in which the harvester operates on an inclined surface, in accordance with an aspect of the present disclosure.

FIG. 5 is a schematic diagram of an embodiment of the control system 300 of FIG. 3. In this embodiment, the agricultural system operates on an inclined surface 502. The crops, such as left stalk 504 and right stalk 506 may grow at an angle to the inclined surface 502. The header 200 may be angled substantially parallel to the inclined surface 502. The controller may adjust the course of the agricultural system 100 in response to downhill vehicle drift. In one example, the agricultural system may drift downhill under the influence of gravity. Due to this drifting, the left horizontal distance 309 may grow larger than the right horizontal distance 316. In response, the controller may adjust the course of the agricultural system 100 to the right.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system comprising:
   a controller comprising a memory and a processor, wherein the controller is configured to:
   receive first one-dimensional (1D) distance data from a first sensor, wherein the first sensor is configured to be mounted on an agricultural header of an agricultural system;
   determine a first horizontal distance from the first sensor to a first plant stalk based on the first 1D distance data; and
   control a steering system of the agricultural system to adjust a position of the agricultural header relative to the first plant stalk based on the first horizontal distance.

2. The control system of claim 1, wherein the controller is configured to:
   receive second 1D distance data from a second sensor;
   determine a second horizontal distance from the second sensor to a second plant stalk based on the second 1D distance data; and
   control the steering system of the agricultural system to adjust the position of the agricultural header relative to the first and second plant stalks based on a difference between the first horizontal distance and the second horizontal distance.

3. The control system of claim 2, wherein at least one of the first sensor and the second sensor comprises a radar sensor.

4. The control system of claim 2, wherein the controller is configured to:
   determine a first vertical distance from the first sensor to a soil surface based on the first 1D distance data; and
   determine a second vertical distance from the second sensor to the soil surface based on the second 1D distance data.

5. The control system of claim 4, wherein the controller is configured to determine whether an average of the first vertical distance and the second vertical distance are within a threshold range.

6. The control system of claim 5, wherein the controller is configured to control a header height actuator to adjust a vertical position of the agricultural header based on a determination that the average of the first vertical distance and the second vertical distance is outside the threshold range.

7. The control system of claim 4, wherein the controller is configured to control a header orientation actuator to adjust an angular orientation of the agricultural header based on the first vertical distance and the second vertical distance.

8. The control system of claim 4, wherein the controller is configured to:
   determine the first horizontal distance and the first vertical distance based on the first 1D distance data and a first angle of the first sensor relative to a horizontal axis parallel to the soil surface; and
   determine the second horizontal distance and the second vertical distance based on the second 1D distance data and a second angle of the second sensor relative to a horizontal axis parallel to the soil surface.

9. An agricultural system, comprising:
   a header configured to harvest crops;
   a first sensor mounted on the header;
   a second mounted on the header; and
   a steering system configured to adjust a position of the header;
   a controller comprising a memory and a processor, wherein the controller is configured to:
   receive first one-dimensional (1D) distance data from the first sensor and second 1D distance data from the second sensor;
   determine a first horizontal distance from the first sensor to a first plant stalk based on the first 1D distance data;
   determine a second horizontal distance from the second sensor to a second plant stalk based on the second 1D distance data; and
   control the steering system of the agricultural system to adjust a position of the header relative to the first and second plant stalks based on a difference between the first horizontal distance and the second horizontal distance.

10. The agricultural system of claim 9, wherein the first sensor is mounted at a left end of the header, the first sensor is oriented partially toward a centerline of the header and partially toward a soil surface, the second sensor is mounted on a right end of the header, and the second sensor is oriented partially toward the centerline of the header and partially toward the soil surface.

11. The agricultural system of claim 9, wherein the controller is configured to:
    determine a first vertical distance from the first sensor to a soil surface based on the first 1D distance data; and
    determine a second vertical distance from the second sensor to the soil surface based on the second 1D distance data.

12. The agricultural system of claim 11, wherein the controller is configured to:
    determine whether an average of the first vertical distance and the second vertical distance are within a threshold range; and
    control a header height actuator configured to control a vertical position of the header to adjust the vertical position of the header based on a determination that the average of the first vertical distance and the second vertical distance is outside the threshold range.

13. The agricultural system of claim 11, wherein the controller is configured to cause a header orientation actuator configured to control an angular orientation of the header to adjust the angular orientation of the header based on the first vertical distance and the second vertical distance.

14. The agricultural system of claim 10, wherein each of the first and second sensors is angled about 45 degrees downward relative to a horizontal axis parallel to the soil surface.

15. The agricultural system of claim 9, wherein at least one of the first sensor and the second sensor comprises a radar sensor.

16. A method, comprising:
receiving, via a processor, first one-dimensional (1D) distance data from a first sensor and second 1D distance data from a second sensor, wherein the first and second sensors are configured to be mounted on an agricultural header of an agricultural system;
determining, via the processor, a first horizontal distance from the first sensor to a first plant stalk based on the first 1D distance data;
determining, via the processor, a second horizontal distance from the second sensor to a second plant stalk based on the second 1D distance data; and
controlling, via the processor, a steering system of the agricultural system to adjust a position of the agricultural header relative to the first and second plant stalks based on a difference between the first horizontal distance and the second horizontal distance.

17. The method of claim 16, comprising:
determining, via the processor, a first vertical distance from the first sensor to the soil surface based on the first 1D distance data; and
determining, via the processor, a second vertical distance from the second sensor to the soil surface based on the second 1D distance data.

18. The method of claim 17, comprising determining, via the processor, whether an average of the first vertical distance and the second vertical distance are within a threshold range.

19. The method of claim 18, comprising causing, via the processor, a first actuator to control a header height actuator to adjust a vertical position of the agricultural header based on the determination that the average of the first vertical distance and the second vertical distance are outside the threshold range.

20. The method of claim 17, comprising controlling a header orientation actuator to adjust an angular orientation of the agricultural header based on the first vertical distance and the second vertical distance.

* * * * *